Figure 1:
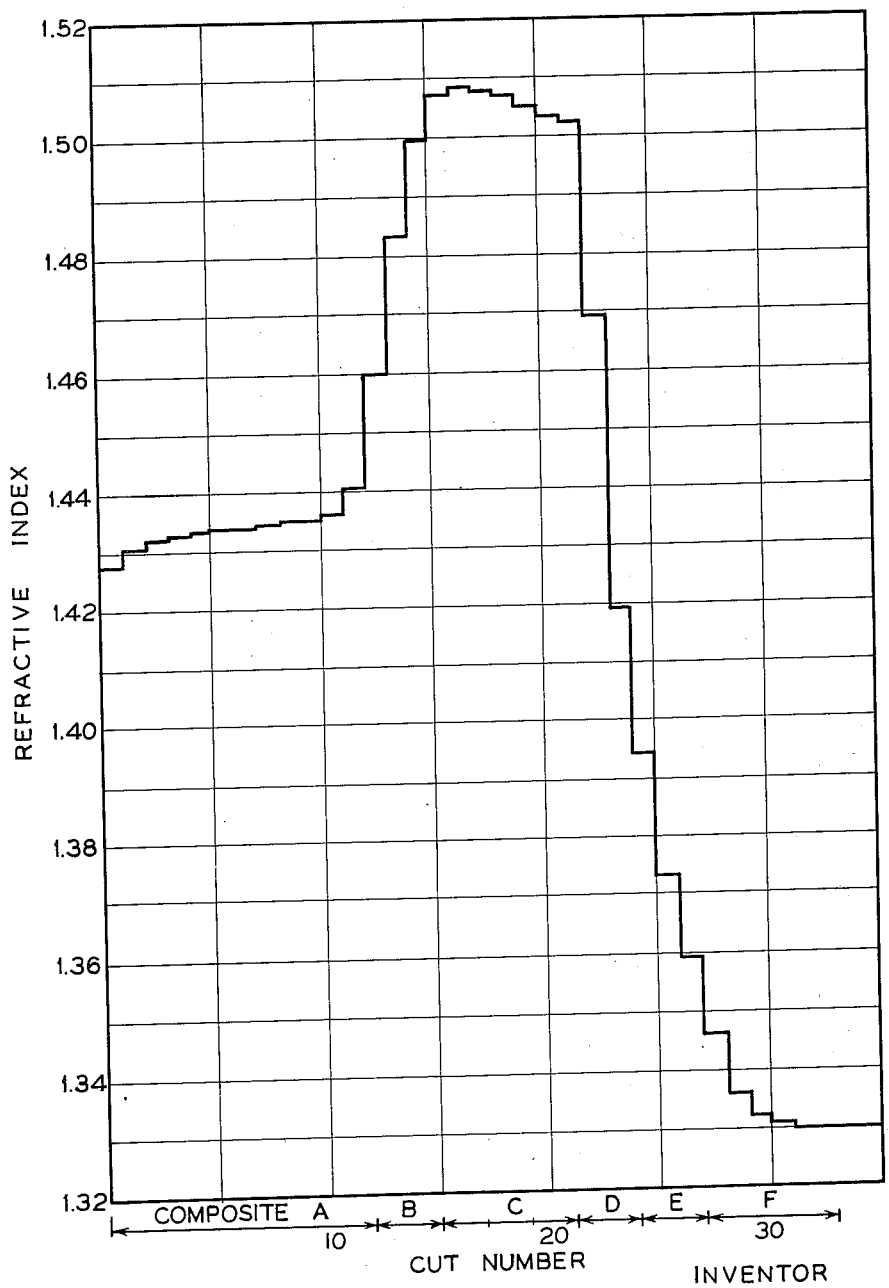

INVENTOR
JOHN Q. COPE JR.

INVENTOR
JOHN Q. COPE JR.
ATTORNEYS

Patented Dec. 9, 1952

2,621,203

UNITED STATES PATENT OFFICE 2,621,203

ADSORPTION SEPARATION OF HYDROCARBONS AND OXYGENATED ORGANIC COMPOUNDS

John Q. Cope, Jr., El Cerrito, Calif., assignor to California Research Corporation, San Francisco, Calif., a corporation of Delaware Application October 4, 1947, Serial No. 777,972

5 Claims. (Cl. 260—450)

The present invention relates to the separation of the components of liquid mixtures of hydrocarbons and oxygenated organic compounds, specifically the crude reaction product containing such a mixture resulting from the catalytic hydrogenation of carbon monoxide to obtain fractions suitable for direct use or for further processing. More particularly, this invention concerns the separation of such products and distillation cuts thereof by preferential adsorption on a solid adsorbent to obtain fractions of increased chemical homogeneity whereby further processing of such separated fractions is facilitated.

The general concept of synthesizing organic compounds by hydrogenation of carbon monoxide has received increasing attention in recent years. The effects of variations in the synthesis gas composition, process operating conditions, and catalyst composition on the reaction and on the product composition have been intensively studied. Reasonably large scale production has been achieved in several processes employing particular synthesis gas compositions, operating conditions and charge stocks. The reaction products of these processes are characterized by complexity of composition. Paraffinic, olefinic, naphthenic and aromatic hydrocarbon compounds and oxygenated organic compounds may be present in the reaction product. The proportions of these constituents are controllable within limits by adjustment of the process variables but process control has not yet been extended to achieve appreciable simplification of the reaction product mixture. Separation from the crude reaction product of components or fractions suitable for direct use or for further processing has been and continues to be an important and difficult auxiliary problem in all of the hydrogen-carbon monoxide synthesis processes so far developed.

It has now been discovered that the crude synthesis product resulting from the hydrogenation of carbon monoxide can be separated by preferential adsorption on a solid adsorbent into fractions of increased chemical homogeneity from the standpoint of both structure and reactivity. These fractions are of such increased uniformity in their general character and chemical response that either their direct use as end products or their further processing is greatly facilitated.

By the process of this invention the crude reaction product obtained by subjecting a charge comprising hydrogen and carbon monoxide to catalytic synthesis conditions is preferably separated by fractional distillation into cuts having a boiling range spread of 100° F. to 200° F. Such a cut is then charged in liquid phase to a columnar mass of solid adsorbent particles and adsorbed thereon. A desorbing liquid for which the adsorbent shows a reasonably strong adsorptive preference is then passed through the adsorbent column in the same direction as that followed by the charge, desorbing the charge and initiating a flow of liquid from the column. The effluent liquid is preferably collected in three cuts, the first comprising a mixture consisting essentially of paraffinic and olefinic hydrocarbons, the second consisting essentially of aromatic hydrocarbons, and the third consisting essentially of oxygenated organic compounds. However, a greater or lesser number of cuts may be taken depending upon the desired degree of segregation.

This separation is facilitated by introducing a co-solvent for the hydrocarbon portion of the charge and for the desorbing liquid into the adsorbent column following the charge and prior to the introduction of the desorbent.

The paraffin-olefin cut may be directly employed as a motor fuel consituent or it may be employed as the olefinic constituent of a charge to an alkylation process; when subjected to alkylating conditions in the presence of an aromatic hydrocarbon an alkylate is produced which upon sulfonation yields an excellent detergent. The aromatic cut may be employed as an octane improving component in motor fuel or it may be further processed by adsorption or otherwise to separate particular aromatic compounds or fractions. The oxygenated organic compound cut is ordinarily processed to separate or prepare alcohols, acids, etc.

The following example illustrates the practice of the process of this invention.

*Example*

The liquid mixture separated pursuant to the invention was a crude reaction product of a Fischer-Tropsch synthesis employing a fluidized iron catalyst, and a hydrogen/carbon ratio of about 2:1. The hydrogen-carbon monoxide mixture was passed into contact with the catalyst at about 600° F. This crude had an API gravity of 48.8 and an ASTM D–86 distillation showed:

|  | °F. |
|---|---|
| Start | 118 |
| 5 percent | 170 |
| 10 percent | 200 |
| 20 percent | 238 |
| 30 percent | 264 |
| 40 percent | 292 |
| 50 percent | 320 |
| 60 percent | 342 |
| 70 percent | 398 |
| 80 percent | 451 |
| 90 percent | 540 |
| 95 percent | 600 |
| End point | 610 | the charge and for the alcohol desorbent, were charged to the bottom of the column and the benzene was followed by 850 cc. of methyl alcohol, both the benzene and alcohol being charged at 300 cc./hr. The liquid effluent from the column was taken in 25 cc. cuts. A total of 43 cuts were taken and inspected. Following preliminary inspection the cuts were combined to form seven composite fractions as indicated by the letters A to G, inclusive, in the following table. The composites were subjected to distillation to 250° F. to remove benzene and alcohol as overhead fractions and the bottoms representing recovered portions of the Fischer-Tropsch cut charged were removed and tested. Observations made on the 43 cuts prior to composition and distillation, and on the distillation bottoms obtained from the seven composites are recorded in the following table.

TABLE 1

| Cut No. | Volume | Inspections on cuts | | Composites | | Bottoms at 250° F. of composites | | | | | | Br. No. |
|---|---|---|---|---|---|---|---|---|---|---|---|---|
| | | R. I. | Br. No. | No. | Vol. | Vol. | R. I. | API gr. | Mol. wt. | Neut. No.[1] | Hydrox. No.[1] | Carbonyl No.[2] | |
| | Cc. | | | | | | | | | | | | |
| 1 | 25 | 1.4277 | 20 | A | 300 | 300 | 1.4330 | 52.7 | 166 | | | | 67 |
| 2 | 25 | 1.4308 | 53 | | | | | | | | | | |
| 3 | 25 | 1.4320 | 62 | | | | | | | | | | |
| 4 | 25 | 1.4323 | 65 | | | | | | | | | | |
| 5 | 25 | 1.4327 | 75 | | | | | | | | | | |
| 6 | 25 | 1.4329 | 78 | | | | | | | | | | |
| 7 | 25 | 1.4333 | 75 | | | | | | | | | | |
| 8 | 25 | 1.4337 | 74 | | | | | | | | | | |
| 9 | 25 | 1.4341 | 77 | | | | | | | | | | |
| 10 | 25 | 1.4348 | 77 | | | | | | | | | | |
| 11 | 25 | 1.4358 | 71 | | | | | | | | | | |
| 12 | 25 | 1.4410 | 70 | | | | | | | | | | |
| 13 | 25 | 1.4604 | 59 | B | 75 | 73 | 1.4830 | 33.6 | 143 | 0 | 2 | 42.3 | 37 |
| 14 | 25 | 1.4850 | 37 | | | | | | | | | | |
| 15 | 25 | 1.5001 | 25 | | | | | | | | | | |
| 16 | 25 | 1.5071 | 21 | C | 150 | 52 | 1.5173 | 23.6 | 140 | 0 | 0 | 50.3 | 31 |
| 17 | 25 | 1.5087 | 19 | | | | | | | | | | |
| 18 | 25 | 1.5082 | 15 | | | | | | | | | | |
| 19 | 25 | 1.5068 | | | | | | | | | | | |
| 20 | 25 | 1.5050 | | | | | | | | | | | |
| 21 | 25 | 1.5033 | | | | | | | | | | | |
| 22 | 25 | 1.5021 | | | | | | | | | | | |
| 23 | 25 | 1.4687 | | D | 75 | 25 | 1.4473 | 26.1 | 159 | 89.2 | 140 | (321) | 31 |
| 24 | 25 | 1.4192 | | | | | | | | | | | |
| 25 | 25 | 1.3949 | | | | | | | | | | | |
| 26 | 25 | 1.3734 | | E | 75 | 24 | 1.4439 | 26.5 | 158 | 89.0 | 185 | (203) | 30 |
| 27 | 25 | 1.3588 | | | | | | | | | | | |
| 28 | 25 | 1.3461 | | | | | | | | | | | |
| 29 | 25 | 1.3358 | | | | | | | | | | | |
| 30 | 25 | 1.3322 | | F | 125 | 3 | | | | 89 | (188) | (270) | 30 |
| 31 | 25 | 1.3312 | | | | | | | | | | | |
| 32 | 25 | 1.3300 | | | | | | | | | | | |
| 33 | 25 | 1.3300 | | | | | | | | | | | |
| 34 | 25 | 1.3297 | | | | | | | | | | | |
| 35 | 25 | 1.3290 | | G | 250 | 0 | | | | | | | |
| To and including 43 | 25 | 1.3290 | | | | | | | | | | | |

[1] Determination described J. A. C. S. 57 61, 1935.
[2] Determination described J. A. C. S. 57 57, 1935.

A heart cut including the overhead between the 55% and 77.5% was separated from this crude by distillation. An ASTM D–86 distillation of this cut shows:

|  | °F. |
|---|---|
| Initial | 360 |
| 10 percent | 374 |
| 50 percent | 400 |
| 90 percent | 443 |
| End point | 470 |

The cut had an API gravity of 46.2, an average molecular weight 160, a neutralization number 12.4, a hydroxyl number 27.8, a carbonyl number 27.9 and a bromine number 63.5.

A glass column 100 inches long and 1 inch in diameter was packed with 810 grams of 28–200 mesh silica gel. 500 cc. of the above-described cut were charged to the bottom of the column at 300 cc./hr. Upon completion of the introduction of the charge, 150 cc. of benzene, which acts as a co-solvent for the paraffinic-olefinic fraction of Upon completion of the desorption, isooctane was introduced into the adsorption column to strip the alcohol from the adsorbent and concurrently regenerate it for reuse. Four volumes of isooctane were useed for each volume of adsorbent present in the column.

Composite A includes 60% of the charge material and from carbon-hydrogen ratio and bromine number determinations is concluded to have an olefin content of about 71%. If cuts 5–12 inclusive are composited, a 40% yield of 87% olefin content may be recovered. Infrared inspections indicate fairly straight chain carbon linkages in this material with the unsaturation predominantly in the form of 1-olefins with only small amounts of $RHC=CHR$ and $H_2C=CR_2$ present. The composite is water white and of pleasant odor. It may be used directly and with excellent results as the olefinic component in the preparation of an alkyl aryl sulfonate detergent by the process described in the copending application of Lewis Serial No. 718,492, filed December 26, 1946.

Composite B is a transition fraction or blur containing principally aromatics but containing also some olefinic material. This composite is recycled with fresh charge into contact with the adsorbent in a continuous or cyclic operation.

Composite C is a highly aromatic material representing 10.5% of the charge and consisting principally of alkyl benzenes. It shows some unsaturation and a moderate carbonyl number. It may be used directly as an octane improving component of motor fuel or it may be further processed for the separation of particular aromatics by selective adsorption or otherwise.

Composites D, E and F, when combined, represent 10.5% of the charge consisting of oxygenated organic compounds. This material is of dark color and unpleasant odor and contains all of the acid, all of the groups reacting to hydroxyl number determinations and most of the material reacting to give a carbonyl number, which was contained in the charge. The recovery of particular oxygenated organic compounds or fractions is facilitated by the use of this concentrate as a starting material.

Figures 1, 2, 3 and 4 of the appended drawings are graphical representations of the observations made upon the material recovered in the successive cuts in the foregoing example and in further runs conducted under substantially identical conditions.

In Figure 1 the refractive index values of Table 1 are plotted against the cut numbers. The sharpness of separation is indicated by the abrupt rise in the refractive index values of the cuts from about 1.43 to above 1.50 as the aromatic components of the charge appear in the effluent liquid. Similarly an abrupt drop to about 1.3 occurs as the oxygenated compounds are desorbed.

Figure 2:
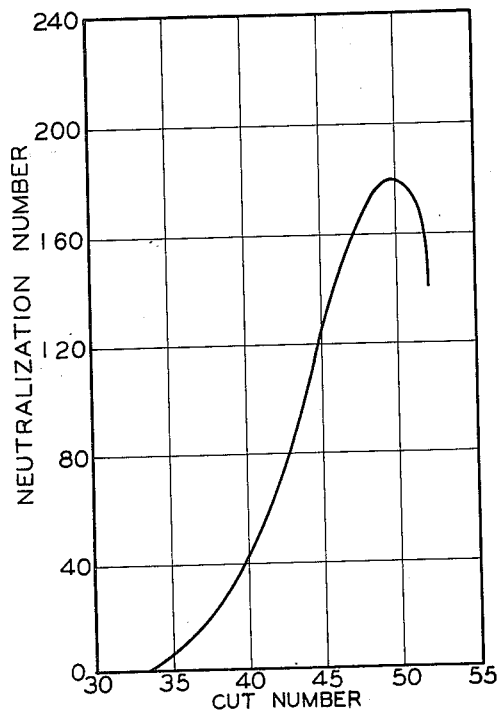

In Figure 2 the neutralization number of the charge material recovered from successive cuts is plotted against the cut number. Olefins, paraffins and aromatics amounting to approximately 90% of the charge were recovered in the first 34 cuts in which the neutralization number was zero. The value rose sharply as the oxygenated compounds contained in the charge appeared in the effluent liquid.

Figure 3:
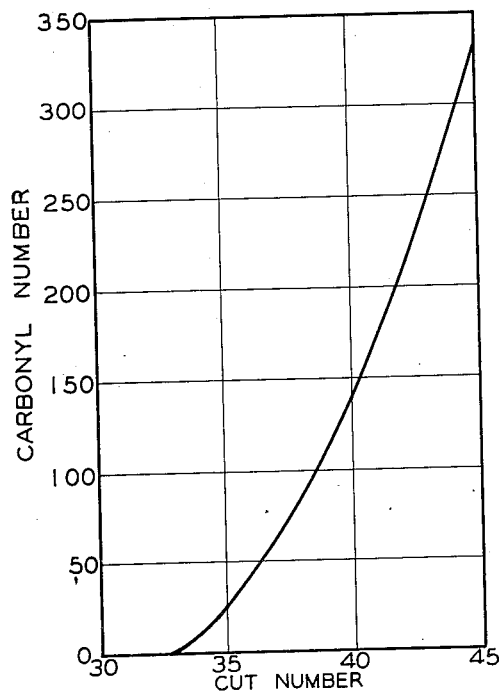

In Figure 3 carbonyl numbers indicative of aldehydic and ketonic content are plotted against cut numbers of the same run as that illustrated in Figure 2. The abrupt rise of the carbonyl number from zero to 340 illustrates the sharpness of separation between hydrocarbons and oxygenated compounds.

Figure 4:
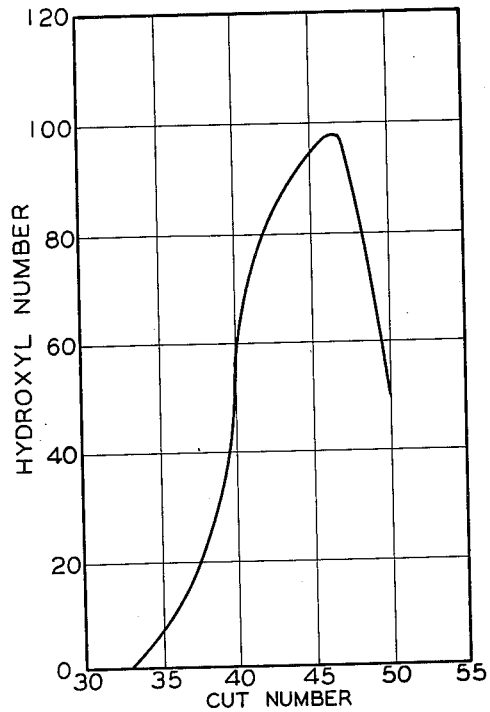

In Figure 4 the hydroxyl numbers indicative of the alcohol content are plotted against cut numbers. The hydroxyl number is zero or very close to zero for the first 33 cuts but rises sharply after the thirty-third cut has been taken showing the abrupt appearance of alcohols in the desorbed material.

The simultaneous and abrupt appearance in the effluent liquid of materials responsive to neutralization number, hydroxyl number, and carbonyl number indicates that several types of oxygenated organic compounds are desorbed at the same stage in the process.

The separation as effected in the foregoing example may be varied in several respects according to the character of the charge and the separation desired to be effected. For instance, the charge stock of the example could be separated into two fractions, a hydrocarbon fraction containing paraffins, olefins and aromatics and a fraction containing oxygenated compounds. In such a separation composites A, B, and C of table 1 would constitute the hydrocarbon fraction and D, E, and F the oxygenated fraction. The hydrocarbon fraction would be suitable for use as a motor fuel component and the oxygenated fraction would ordinarily be further processed or separated.

When a charge comprising hydrogen and carbon monoxide is subjected to catalytic synthesis conditions the charge composition and process variables may be adjusted to control the composition of the reaction product within limits. For example, the Fischer-Tropsch reaction may be operated to produce relatively minor amounts of aromatics and oxygenated compounds. A German development known as the "OXO" process which charges carbon monoxide, hydrogen and olefins to a catalytic reaction zone will produce predominantly oxygenated compounds and the hydrocarbons contained in its crude reaction product will be paraffins and olefins. The process of this invention may be adapted to meet such variations in the composition of the charge stock and applied to advantage to separate the products of the "OXO" process.

Where large quantities of crude synthesis product are to be separated, the following four steps are taken in a preferred mode of operation.

First, the crude synthesis product is fractionally distilled to separate fractions having a boiling range spread of 100° F. to 200° F., the particular cuts being selected with a view to use. While it is possible to charge the entire reaction product of the synthesis to the adsorption zone and obtain separation, the separation is substantially improved by preliminarily fractionally distilling the crude product into fractions having a maximum boiling point spread within the range of 100° F.–200° F. The components of such cuts are much more uniform with respect to molecular weight than are the components of the entire crude synthesis product. As a result, the selective adsorptive preference of the adsorbent is exercised on the basis of chemical type and is relatively uninfluenced by molecular weight differences. Without this substantial molecular weight uniformity two materials of different chemical type and unduly different molecular weight might be adsorbed together, the preference due to chemical type difference being offset to a considerable degree by molecular weight difference.

Second, a quantity of a particular fraction provided as above described is introduced into an adsorption zone which may be constituted by a single columnar mass of solid adsorbent particles, or several such columns serially connected, or a continuous countercurrent adsorption zone of the character disclosed in copending application Claussen et al. Serial No. 607,730, filed July 30, 1945. The quantity introduced is just short of that sufficient to exhaust the selective adsorptive capacity of the adsorbent for the component or components which it is desired to hold upon the adsorbent. If the charge of the example be employed and it is desired to separate a paraffin-olefin fraction, an aromatic fraction, and an oxygenated fraction, the quantity charged would have an aromatic and oxygenated compound content just short of that which would exhaust the selective adsorptive capacity of the adsorbent for these components. This quantity may conveniently be determined by running a small quantity of charge through a laboratory column containing a weighed quantity of the adsorbent and checking the effluent from the column to determine the point at which the aromatics first appear in the effluent. The charge to adsorbent ratio may then be calculated in terms of volume of charge per gram or other mass unit of adsorbent and this figure may be used to determine maximum charge to a column of any size. The aromatics and oxygenated compounds comprising the adsorbate could then be separated by taking the effluent liquid during the following desorption step in two successive fractions. If, using the same charge, it were desired to separate only a total hydrocarbon fraction and any oxygenated fraction, a similar determination in a laboratory column would indicate the maximum charge to adsorbent ratio which could be employed. During the introduction of the charge the non-adsorbed fraction flows from the column and is collected as a product.

Third, upon completion of the introduction of the charge, a desorbent liquid is introduced into the adsorption zone. The desorbent must be a liquid for which the adsorbent shows a marked adsorptive preference and should be mutually soluble with the material selectively adsorbed from the charge and held on the adsorbent, that is, with the adsorbate. The desorbent liquid is preferably more strongly adsorbed than the selectively adsorbed component or components of the charge. The light alcohols, particularly methyl and ethyl alcohols, have been found effective in desorbing the oxygenated compounds of the charge from the adsorbent. It is found that in cases where the charge consists predominantly of paraffins, olefins and oxygenated compounds and contains only minor amounts of aromatics, desorption is greatly facilitated by introducing a mononuclear aromatic compound, such as benzene, into the adsorption zone following the charge and prior to the introduction of the alcoholic desorbing liquid or by mixing such an aromatic compound with a light alcohol and using the mixture as the desorbent. It appears that the light alcohols are not readily miscible with the olefinic and paraffinic constituents of the charge and, if used alone, are not efficient in removing from the adsorbent the minor amounts of these materials which are adsorbed together with the preferentially adsorbed oxygenated compounds at equilibrium. The mononuclear aromatic compound introduced is effective in facilitating desorption because of its action as a co-solvent for the hydrocarbon materials of the charge and the alcoholic desorbent. Any liquid which is more strongly adsorbed than the paraffins, less strongly adsorbed than the alcohol or other desorbent employed, and soluble in both feed components and desorbent may be used advantageously as a co-solvent to facilitate desorption. About .25 g. of the mononuclear aromatic compound per gram of adsorbent has been found suitable to facilitate the desorption when a substantially non-aromatic charge is being separated. Where separation of an aromatic containing charge into three fractions, as in the example, is undertaken, the adsorbent holds both oxygenated compounds and aromatics as the adsorbate at the conclusion of the charge introduction step. The desorbent acts upon this composite adsorbed material selectively, successively desorbing first, the aromatic hydrocarbons and then the oxygenated compounds, and these two materials are separately recovered by taking the effluent liquid in two fractions. The quantity of desorbent required will vary somewhat according to the character of the adsorbed material.

Fourth, a stripping liquid is introduced into the adsorption zone at the conclusion of the desorbing step. Any liquid for which the adsorbent shows a lower adsorptive preference than that shown for the preferentially adsorbed fraction of the charge, i. e., oxygenated compounds and aromatics, may be used as a strippant. This liquid may be employed either at normal or at elevated temperature and is in either case employed in sufficient quantity to remove the desorbent from the adsorbent and concurrently reactivate it for re-use. Iso-octane, petroleum ether and like hydrocarbon materials may be suitably employed as stripping liquids. Further, the non-preferentially adsorbed fraction of the liquid charged to the adsorbent for separation and comprising paraffinic hydrocarbons may be employed as the stripping liquid in the manner described in the co-pending application of Merrill et al., Serial No. 751,938. At the completion of the stripping step the adsorbent is saturated with stripping liquid which is desorbed by the charge and recovered when the adsorbent is re-used.

Upon completion of the stripping and reactivation step, the charge is again introduced into the adsorption zone to initiate a new cycle of operation consisting of charge introduction, desorption and stripping. Desorbing and stripping liquids are recovered, ordinarily by distillation, for re-use. Adaptability to separation from the components of the charge by distillation is considered in selecting these liquids.

The nature and character of the present invention having been described and exemplified, I claim:

1. The method of fractionating the crude reaction product obtained by subjecting a charge comprising hydrogen and carbon monoxide to a catalytic synthesis adapted to induce the formation of hydrocarbons and oxygenated organic compounds which comprises contacting said reaction product with a mass of solid adsorbent particles in an adsorption zone to separate an adsorbate consisting essentially of oxygenated organic compounds and a non-adsorbed liquid effluent from said zone consisting essentially of hydrocarbons, contacting the adsorbent with a light alcohol to desorb the adsorbate and contacting the adsorbent with a hydrocarbon liquid to remove the alcohol from the adsorbent and regenerate it for reuse.

2. The method as defined in claim 1 wherein an organic liquid co-solvent for hydrocarbons and the light alcohol comprising a mono-nuclear aromatic hydrocarbon is contacted with the adsorbent following the introduction of the reaction product into the adsorption zone and prior to the introduction of the light alcohol into said zone.

3. The method of separating the crude reaction product comprising hydrocarbons and oxygenated organic compounds obtained by the catalytic hydrogenation of carbon monoxide into fractions of increased chemical homogeneity which comprises passing said reaction product through a mass of solid adsorbent to separate an adsorbate consisting essentially of oxygenated organic compounds and an effluent non-adsorbed liquid consisting essentially of hydrocarbons, continuing the passage of said reaction product through the adsorbent mass until the adsorptive capacity of the adsorbent is substantially completely exhausted by selective adsorption of oxygenated organic compounds, passing through the adsorbent mass a desorbing liquid comprising an alcohol selected from the group consisting of methyl alcohol and ethyl alcohol to desorb the oxygenated organic compounds from the adsorbent, introducing into the adsorbent mass intermediate the introduction of the reaction product and the desorbing liquid a minor amount of a mono-nuclear aromatic hydrocarbon, and passing a paraffinic hydrocarbon liquid through the adsorbent mass to remove the desorbing liquid from the adsorbent and regenerate the adsorbent for reuse.

4. The method as defined in claim 3 wherein the mono-nuclear aromatic hydrocarbon is benzene and the solid adsorbent is silica gel.

5. The method of separating the crude reaction product comprising hydrocarbons and oxygenated organic compounds obtained by the catalytic hydrogenation of carbon monoxide into fractions of increased chemical homogeneity which comprises passing said reaction product through a mass of silica gel to separate an absorbate consisting essentially of oxygenated organic compounds and an effluent non-adsorbed liquid consisting essentially of hydrocarbons, continuing the passage of said reaction product through the adsorbent mass until the adsorptive capacity of the adsorbent is substantially completely exhausted by selective adsorption of oxygenated organic compounds, passing through the adsorbent mass a desorbing liquid comprising a mixture of an alcohol selected from the group consisting of methyl alcohol and ethyl alcohol and a mono-nuclear aromatic hydrocarbon to desorb the oxygenated organic compounds from the adsorbent, and passing a paraffinic hydrocarbon liquid at an elevated temperature to the adsorbent mass to remove desorbing liquid from the adsorbent and regenerate the adsorbent for reuse.

JOHN Q. COPE, Jr.

REFERENCES CITED

The following references are of record in the file of this patent:

UNITED STATES PATENTS

| Number | Name | Date |
| --- | --- | --- |
| 2,398,101 | Lipkin | Apr. 9, 1946 |
| 2,410,642 | Farkas | Nov. 5, 1946 |

OTHER REFERENCES

Strain, Chromatographic Adsorption Analysis, Pub. by Interscience Pub. Inc., N. Y. (1942) pp. 1–4, 14, 15, 45, 46, 85, 90, 91.

Mair, Jour. Res. Nat. Bur. Stand., vol. 34, pp. 435–51 (1945).

Naval Tech. Mission to Europe—The Synthesis of Hydrocarbons and Chemicals from CO and $H_2$, pp. 1, 73 and 88. (1945).